(12) United States Patent
Dai et al.

(10) Patent No.: US 11,405,891 B2
(45) Date of Patent: Aug. 2, 2022

(54) DATA TRANSMISSION METHOD AND APPARATUS, TERMINAL, AND BASE STATION

(71) Applicant: ZTE CORPORATION, Guangdong (CN)

(72) Inventors: Bo Dai, Guangdong (CN); Zhifeng Yuan, Guangdong (CN); Kun Liu, Guangdong (CN); Zhongda Du, Guangdong (CN); Yifei Yuan, Guangdong (CN)

(73) Assignee: ZTE CORPORATION

( * ) Notice: Subject to any disclaimer, the term of this patent is extended or adjusted under 35 U.S.C. 154(b) by 105 days.

(21) Appl. No.: 16/961,289

(22) PCT Filed: Jan. 11, 2019

(86) PCT No.: PCT/CN2019/071278
§ 371 (c)(1),
(2) Date: Jul. 10, 2020

(87) PCT Pub. No.: WO2019/137451
PCT Pub. Date: Jul. 18, 2019

(65) Prior Publication Data
US 2021/0084617 A1    Mar. 18, 2021

(30) Foreign Application Priority Data
Jan. 12, 2018  (CN) .......................... 201810031211.X

(51) Int. Cl.
*H04W 72/02*    (2009.01)
*H04W 24/10*    (2009.01)
(Continued)

(52) U.S. Cl.
CPC .......... *H04W 72/02* (2013.01); *H04W 24/10* (2013.01); *H04W 72/0493* (2013.01); *H04W 72/1257* (2013.01); *H04W 72/1268* (2013.01)

(58) Field of Classification Search
CPC ..... H04W 72/02; H04W 24/10; H04W 72/04; H04W 72/0493; H04W 72/1257; H04W 72/1268
See application file for complete search history.

(56) References Cited

U.S. PATENT DOCUMENTS

2008/0075094 A1    3/2008  Ahn et al.
2012/0039290 A1*   2/2012  Vrzic .................... H04L 5/0092
                                                  370/329
(Continued)

FOREIGN PATENT DOCUMENTS

CN    101702961 A    5/2010
CN    106162840      11/2016
(Continued)

OTHER PUBLICATIONS

Chinese Office Action and Search Report dated Apr. 27, 2021; Chinese Patent Application No. 201810031211.X.
(Continued)

*Primary Examiner* — Deepa Belur
(74) *Attorney, Agent, or Firm* — McDonald Hopkins LLC

(57) ABSTRACT

Provided are a data transmission method and apparatus, a terminal and a base station. The data transmission method includes selecting, by a terminal, reference information from a reference information set corresponding to a preset reference information type; obtaining a first target data packet according to the selected reference information and a data packet to be transmitted; and sending the first target data packet to a base station.

20 Claims, 2 Drawing Sheets

---

1010
A terminal selects reference information from a reference information set corresponding to a preset reference information type 1020
Obtain a first target data packet according to the selected reference information and a data packet to be transmitted 1030
Send the first target data packet to a base station

(51) Int. Cl.
    *H04W 72/04*     (2009.01)
    *H04W 72/12*     (2009.01)

(56)           References Cited

U.S. PATENT DOCUMENTS

| | | | | |
|---|---|---|---|---|
| 2019/0246376 A1* | 8/2019 | Tang | ............... | H04W 72/042 |
| 2019/0246424 A1* | 8/2019 | Zhang | ............... | H04W 74/08 |
| 2021/0385797 A1* | 12/2021 | Zhang | ............... | H04L 5/0094 |

FOREIGN PATENT DOCUMENTS

| | | | | |
|---|---|---|---|---|
| CN | 106455066 A | 2/2017 | | |
| CN | 106507367 A | 3/2017 | | |
| CN | 107371270 | 11/2017 | | |
| CN | 107404369 | 11/2017 | | |
| CN | 108259153 | 7/2018 | | |
| WO | WO-2016070561 A * | 5/2016 | ............ | H04W 72/12 |
| WO | WO-2017024912 A1 * | 2/2017 | ............... | H04L 5/00 |
| WO | WO-2019237938 A1 * | 12/2019 | ............ | H04W 24/08 |

OTHER PUBLICATIONS

Australian Examination Report dated Feb. 17, 2021; Australian Patent Application No. 2019207128.
Patent Cooperation Treaty (PCT), International Search Report and Written Opinion for Application PCT/CN2019/071278 filed on Jan. 11, 2019, dated Apr. 2, 2019, International Searching Authority, CN.

* cited by examiner

DATA TRANSMISSION METHOD AND APPARATUS, TERMINAL, AND BASE STATION

CROSS-REFERENCE TO RELATED APPLICATION

This is a National Stage Application, filed under U.S.C. 371, OF International Application No. PCT/CN2019/071278 filed on Jan. 11, 2019, which claims the priority of Chinese patent application No. 201810031211.X filed on Jan. 12, 2018, contents of which are incorporated herein by reference in entirety their entireties.

TECHNICAL FIELD

The present disclosure relates to the technical field of communications, for example, to a data transmission method and apparatus, a terminal, and a base station.

BACKGROUND

The process of a user equipment (UE) accessing a wireless network is generally described as follows: the UE randomly selects an access resource in the access resource pool configured by a base station to send an access message (a message 1), the base station detects access messages on the access resource pool, and sends a feedback message (a message 2) for each detected access message, where the message 2 includes uplink timing adjustment information and information about a resource occupied by the UE when sending a data packet (a message 3), the UE sends the message 3 to the base station on a resource allocated by the base station, and when the base station successfully decodes the message 3, the base station sends a response message (a message 4) to the terminal. During this process, since the access resource pool includes resources shared by all UEs, when the number of UEs is relatively large, two or more UEs may select a same access resource and send a message 1 on the same access resource (assuming that two UEs, which are a UE A and a UE B respectively, send the message 1 on the same access resource), and the base station cannot identify multiple UEs on the same access resource, therefore, the base station will send a same message 2 to the UE A and the UE B, which causes the UE A and the UE B to send a messages 3 on a same resource in a same transmission mode and using the same reference information (e.g., a reference signal sequence or a scrambling sequence, etc.), so that the mutual interference between the message 3 of the UE A and the message 3 of the UE B is very significant, then the base station cannot correctly decode the message 3 of the UE A and the message 3 of the UE B. Once the message 3 of the UE A and the message 3 of the UE B cannot be decoded by the base station, the base station will send same scheduling information for retransmitting the message 3 to the UE A and the UE B. After receiving the same scheduling information, the UE A and the UE B will retransmit the message 3 in the same transmission mode and using the same reference information, thus resulting in that the base station is unable to correctly decode the message 3. The process will be repeated until the maximum retransmission times or the maximum retransmission time is reached, the UE exits the access process and restarts an access.

Hence, the collision of multiple UE access messages will inevitably lead to invalid resource scheduling, thus not only wasting a large number of wireless resources, but also increasing the time spent by UE for accessing the network.

In the related art, an intuitive scheme is to increase the number of access resources, so as to reduce the probability of user equipment access collision.

However, since the number of access resources needs to be configured by the base station through a system message, once a large number of access resources are configured through the system message, when the access number of user equipments at the same time is not much, and the number of access resources cannot be dynamically adjusted, which will cause the configured access resources to be underutilized. On the other hand, the access resources are divided from network resources, when a large number of network resources are divided into the access resources, the number of available network resources will be correspondingly reduced, thus reducing the network data transmission rate.

SUMMARY

The present disclosure provides a data transmission method and apparatus, a terminal and a base station, which can improve the probability of correctly decoding data packets sent by multiple UEs on a same resource.

A data transmission method is provided in the present disclosure and includes steps described below.

A terminal selects reference information from a reference information set corresponding to a preset reference information type;

a first target data packet is obtained according to the selected reference information and a data packet to be transmitted; and the first target data packet is sent to a base station.

A data transmission method is further provided in the present disclosure and includes steps described below.

A base station receives a first target data packet sent by a terminal, where the first target data packet is obtained by the terminal according to reference information and a data packet to be transmitted, and the reference information is selected by the terminal from a reference information set corresponding to a preset reference information type.

The present disclosure further provides a terminal. The terminal includes a selection module, a processing module and a first sending module.

The selection module is configured to select reference information from a reference information set corresponding to a preset reference information type.

The processing module is configured to obtain a first target data packet according to the selected reference information and a data packet to be transmitted.

The first sending module is configured to send the first target data packet to a base station.

The present disclosure further provides a base station. The base station includes a second receiving module.

The second receiving module is configured to receive a first target data packet sent by a terminal, where the first target data packet is obtained by the terminal according to reference information and a data packet to be transmitted, and the reference information is selected by the terminal from a reference information set corresponding to a preset reference information type.

DETAILED DESCRIPTION

The embodiments of the present disclosure will be described hereinafter in conjunction with the drawings.

The steps illustrated in the flowcharts of the drawings may be performed for example by a computer system having a group of computer-executable instructions.

Embodiment One

Figure 1:
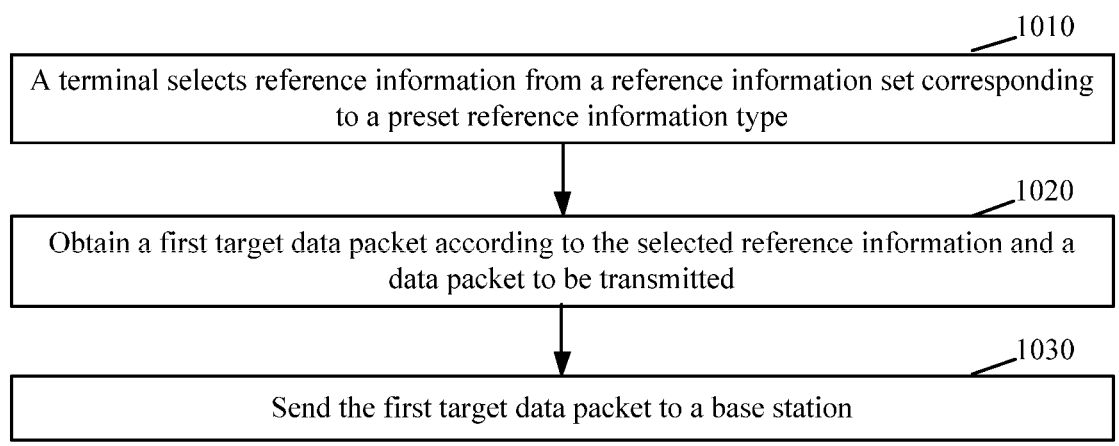
FIG. 1 is a flowchart of a data transmission method according to an embodiment.

The present embodiment provides a data transmission method. As shown in FIG. 1, the method includes steps described below.

In step 1010, a terminal selects reference information from a reference information set corresponding to a preset reference information type.

In an embodiment, the preset reference information type includes at least one of seven reference information types, and the seven reference information types include a reference signal sequence, a scrambling sequence, a transmission resource set, a size of a transmission block, a phase rotation value, a reference power value of a transmission data packet and a boosting power value of the transmission data packet, where a $k^{th}$ reference information type includes $X_k$ pieces of reference information, $X_k$ is a positive integer, and k=1, 2, . . . , 7. Quantities of reference information included in different reference information types may be the same or different.

In an embodiment, it is assumed that the preset reference information type includes a reference information type of the reference signal sequence, then the reference information set is a reference signal sequence set, and the step in which the reference information is selected from the reference information set corresponding to the preset reference information type refers to selecting the reference signal sequence from the reference signal sequence set. It is assumed that the preset reference information type includes a reference information type of the scrambling sequence, then the reference information set is a scrambling sequence set, and the step in which the reference information is selected from the reference information set corresponding to the preset reference information type refers to selecting the scrambling sequence from the scrambling sequence set. And it is assumed that the preset reference information type includes the reference information type of the reference signal sequence and the reference information type of the scrambling sequence, the reference information set is the reference signal sequence set and the scrambling sequence set, and the step in which the reference information is selected from the reference information set corresponding to the preset reference information type refers to selecting the reference signal sequence from the reference signal sequence set and selecting the scrambling sequence from the scrambling sequence set.

In an embodiment, when the preset reference information type includes at least two reference information types, a mapping relationship exists among reference information of different reference information types. For example, it is assumed that the reference information type includes the reference information type of the reference signal sequence and the reference information type of the scrambling sequence, a mapping relationship exists between reference signal sequence information in the reference signal sequence set and scrambling sequence information in the scrambling sequence set.

In step 1020, a first target data packet is obtained according to the selected reference information and a data packet to be transmitted.

In an embodiment, if the selected reference information is a reference signal sequence, the first target data packet is a data packet to be transmitted and added with the reference signal sequence; if the selected reference information is a scrambling sequence, the first target data packet is a data packet to be transmitted which has been scrambled by the scrambling sequence; and if the selected reference information is the reference signal sequence and the scrambling sequence, the first target data packet is a data packet to be transmitted which has been scrambled by the scrambling sequence and has added with the reference signal sequence.

In step 1030, the first target data packet is sent to a base station.

In the data transmission method provided by the present embodiment, the terminal selects the reference information from the reference information set corresponding to the preset reference information type, the first target data packet is obtained according to the selected reference information and the data packet to be transmitted, and the first target data packet is sent to the base station. As it can be seen from the present embodiment, since the reference information is selected from the reference information set corresponding to the preset reference information type by the terminal, the probability of selecting same reference information by different terminals is relatively low. When reference information selected by different terminals is different, the interference among data packets will be greatly reduced, thus improving the probability of the data packets being correctly decoded.

In an embodiment, before the terminal selects the reference information from the reference information set corresponding to the preset reference information type, the data transmission method further includes a step described below. The terminal receives scheduling information sent by the base station and containing a first resource identification, where the scheduling information is used for indicating the terminal to send the data packet to be transmitted, and the first resource identification is used for identifying a resource occupied by the terminal when sending the first target data packet. The scheduling information is usually scheduling information corresponding to a physical layer and may dynamically schedule the terminal data transmission.

In an embodiment, the data packet to be transmitted is a data packet corresponding to a message 3 in a process of the terminal accessing a network, and the scheduling information is scheduling information corresponding to the message 3 in the process of the terminal accessing the network.

In an embodiment, the data packet to be transmitted is a data packet sent to the base station for a first time, or, the data packet to be transmitted is a data packet resent to the base station. The resent data packet includes a retransmission of the message 3 of a message 1, a message 2 and the message 3 in one accessing process, and also includes a first transmission and resending of the message 3 in a process of attempting to re-access after the UE fails the first network access.

In an embodiment, the technical scheme in the related art is adopted when the data packet to be transmitted is sent for the first time, when the data packet to be transmitted is resent, the reference information is selected from the reference information set corresponding to the preset reference information type, and then the data packet to be transmitted is resent, so that unnecessary blind detection complexity of the base station can be reduced.

In an embodiment, the step in which the terminal selects the reference information from the reference information set corresponding to the preset reference information type includes a step described below. The terminal selects the reference information in a preset selection mode from the reference information set corresponding to the preset reference information type.

In an embodiment, the preset selection mode includes one of a random selection mode, a mode for performing a selection according to a terminal identification corresponding to the terminal, a mode for performing a selection according to a downlink measurement value of the terminal, or a mode for performing a selection according to a size of a data packet to be transmitted.

In an embodiment, the mode for performing the selection according to the terminal identification corresponding to the terminal includes a mode for performing a selection according to a mapping relationship established between the terminal identification and the reference information, for example, the reference information includes one or more types of the reference signal sequence, the scrambling sequence, the transmission resource set, the size of the transmission block, the phase rotation value, the reference power value of the transmission data packet or the boosting power value of the transmission data packet.

It is assumed that there are Y types of the reference information set, and reference information varies from set to set, for example, a reference information set R0 corresponds to a scrambling sequence B1 and a reference signal sequence C1, a reference information set R1 corresponds to a scrambling sequence B2 and a reference signal sequence C2, and a reference information set R2 corresponds to a scrambling sequence B3 and a reference signal sequence C3. When the terminal identification is Z, the reference information set corresponding to the terminal is ZmodY (mod is the modulus operation).

In the process of the terminal accessing the network, the base station sends the message 2 for indicating a resource position where the terminal transmits the message 3, and the terminal determines corresponding reference information according to the terminal identification of itself and performs the data packet transmission according to the reference information.

The mode for performing the selection according to the downlink measurement value of the terminal includes one of: a mode for performing a selection according to a mapping relationship established between a downlink status measurement value of the terminal and the reference information, a mode for performing a selection according to a mapping relationship established between a downlink path loss measurement value and the reference information, or a mode for performing a selection according to a mapping relationship established between a receiving power measurement value of a downlink reference signal and the reference information. For example, the reference information includes one or more types of the reference signal sequence, the scrambling sequence, the transmission resource set, the size of the transmission block, the phase rotation value, the reference power value of the transmission data packet or the boosting power value of the transmission data packet. Different downlink measurement values correspond to different reference information sets, for example, if the downlink measurement value is less than or equal to S1, the corresponding scrambling sequence is B1, the reference signal sequence is C1, the reference power value of the transmission data packet is D1 and the boosting power value of the transmission data packet is E1; if the downlink measurement value is great than S1 and less than or equal to S2, the corresponding scrambling sequence is B2, the reference signal sequence is C2, the reference power value of the transmission data packet is D2, and the boosting power value of the transmission data packet is E2; and if the downlink measurement value is greater than S2, the corresponding scrambling sequence is B3, the reference signal sequence is C3, the reference power value of the transmission data packet is D3, and the boosting power value of the transmission data packet is E3. In the process of the terminal accessing the network, the base station sends the message 2 for indicating the resource position where the terminal transmits the message 3, and the terminal performs downlink measurement to acquire a downlink measurement value, determines corresponding reference information according to the acquired measurement value, and performs the data packet transmission according to the reference information.

The mode for performing the selection according to the size of the data packet to be transmitted includes a mode for performing a selection according to a mapping relationship established between the size of the data packet to be transmitted and the reference information. For example, the reference information includes at least one of the reference signal sequence, the scrambling sequence, the transmission resource set, the size of the transmission block, the phase rotation value, the reference power value of the transmission data packet or the boosting power value of the transmission data packet. Different sizes of data packets to be transmitted correspond to different reference information sets, for example, if the size of the data packet is A1, the corresponding scrambling sequence is B1, the reference signal sequence is C1, and the reference power value of the transmission data packet is D1; if the size of the data packet is A2, the corresponding scrambling sequence is B2, the reference signal sequence is C2, and the reference power value of the transmission data packet is D2; and if the size of the data packet is A3, the corresponding scrambling sequence is B3, the reference signal sequence is C3, and the reference power value of the transmission data packet is D3. In the process of accessing the network by the terminal, the base station sends the message 2 for indicating the resource position where the terminal transmits the message 3 and a size of the maximum data packet which may be used for transmitting the message 3. According to a predefined size of the data packet that may be transmitted, and on the premise that the maximum size of the data packet constituted by the base station is not exceeded, the terminal selects a predefined data packet having a size closest to the size of a data packet that currently needs to be transmitted, and determines corresponding reference information according to the size of the data packet selected to be transmitted, and performs the data packet transmission according to the reference information. In an embodiment, selecting the size of the data packet includes steps described below. The base station broadcasts a set of sizes of data packets, such as A1, A2, and A3 that the message may transmit, in a system message. It is assumed that A1, A2, and A3 are sorted from small to large, the base station indicates the size of the maximum data packet that the message 3 may transmit is A2 in the message 2, the terminal may select between A1 and A2 according to the data packet which currently needs to be transmitted by the terminal, select corresponding reference information according to a corresponding relationship between the size of the data packet and the reference information, and transmit the corresponding data packet according to the selected reference information.

In an embodiment, after the first target data packet is sent to the base station, the data transmission method further includes steps described below. First retransmission scheduling information sent by the base station and containing a second resource identification is received, and the data packet to be transmitted is resent according to the second resource identification. The first retransmission scheduling information is used for indicating the terminal to resend the data packet to be transmitted, and the second resource identification is used for identifying a resource occupied by the terminal when resending the data packet to be transmitted.

In the present embodiment, the scheme is aimed at the case that the base station only determines whether the first target data packet may be successfully decoded, and after then determines that the first target data packet cannot be decoded successfully.

In an embodiment, the step in which the data packet to be transmitted is resent according to the second resource identification includes steps described below. Reference information is reselected from the reference information set corresponding to the preset reference information type in the preset selection mode, a second target data packet is obtained according to the reselected reference information and the data packet to be transmitted, and the second target data packet is sent to the base station on the resource corresponding to the second resource identification.

In an embodiment, after the first target data packet is sent to the base station, the data transmission method further includes steps described below. Second retransmission scheduling information sent by the base station and containing a third resource identification and target identification information corresponding to the reference information is received, and when the target identification information in the second retransmission scheduling information is the same as identification information corresponding to the reference information selected by the terminal when sending the first target data packet, the data packet to be transmitted is resent according to the third resource identification. The second retransmission scheduling information is used for indicating the terminal to resend the data packet to be transmitted, and the third resource identification is used for identifying a resource occupied by the terminal when resending the data packet to be transmitted.

In the present embodiment, if the terminal judges and determines that the target identification information in the second retransmission scheduling information is different from the identification information corresponding to the reference information selected by the terminal when sending the first target data packet, which means that the retransmission scheduling information is not sent to the terminal itself, and the terminal discards the retransmission scheduling information. The third resource identification is an identification associated with the target identification information. For example, it is assumed that the UE A selects a reference signal sequence 1 to be sent together with a data packet 1 to be sent, and the UE B selects another reference signal sequence 2 to be sent together with a data packet 2 to be sent, then the identification information corresponding to the reference signal sequence 1 and the identification information corresponding to the reference signal sequence 2 must be different, and the base station will allocate different resource identifications for the UE A and the UE B, so that the UEA and the UE B may resend the data packet to be transmitted on different resources.

In an embodiment, the process of resending the data packet to be transmitted according to the third resource identification is similar to the process of resending the data packet to be transmitted according to the second resource identification, which will not be repeated here.

In an embodiment, the scheme is aimed at the case that the base station determines whether the first target data packet may be successfully decoded and whether the target identification information may be detected, and after then determines that the first target data packet cannot be successfully decoded but the target identification information may be detected.

In the data transmission method provided by the present embodiment, the second retransmission scheduling information sent by the base station and containing the third resource identification and the target identification information corresponding to the reference information is received, and when the target identification information in the second retransmission scheduling information is the same as identification information corresponding to the reference information selected by the terminal when sending the first target data packet, the data packet to be transmitted is resent according to the third resource identification. The second retransmission scheduling information is used for indicating the terminal to resend the data packet to be transmitted, and the third resource identification is used for identifying a resource occupied by the terminal when resending the data packet to be transmitted. As it can be seen from the present embodiment, since the second retransmission scheduling information includes the target identification information used for determining by the terminal whether the retransmission scheduling information is sent to itself, thereby blind retransmission of the data packet to be transmitted can be avoided, and resources are saved.

In an embodiment, after the first target data packet is sent to the base station, the data transmission method further includes steps described below. Third retransmission scheduling information sent by the base station and containing preset information and a fourth resource identification is received, and the data packet to be transmitted is resent according to the fourth resource identification. The third retransmission scheduling information containing the preset information is used for indicating a terminal, which has received the retransmission scheduling information, to resend the data packet to be transmitted, and the fourth resource identification is used for identifying a resource occupied by the terminal when resending the data packet to be transmitted.

In the present embodiment, when the terminal receives the retransmission scheduling information containing the preset information, the data packet to be transmitted is directly resent without any determination.

In the present embodiment, the process of resending the data packet to be transmitted according to the fourth resource identification is similar to the process of resending the data packet to be transmitted according to the second resource identification, which will not be repeated here.

In the present embodiment, the scheme is aimed at the case that the base station determines whether the first target data packet may be successfully decoded and whether the target identification information may be detected, and after then determines that the first target data packet is unsuccessfully decoded and the target identification information is undetected.

In the data transmission method provided by the present embodiment, the third retransmission scheduling information sent by the base station and containing the preset information and the fourth resource identification is received, and the data packet to be transmitted is resent according to the fourth resource identification. The third retransmission scheduling information containing the preset information is used for indicating the terminal, which has received the retransmission scheduling information, to resend the data packet to be transmitted, and the fourth resource identification is used for identifying the resource occupied by the terminal when resending the data packet to be transmitted. As it can be seen from the present embodiment, since the third retransmission scheduling information containing the preset information is used for indicating the terminal, which has received the retransmission scheduling information, to resend the data packet to be transmitted, the terminal may resend the data packet to be transmitted to the base station under the condition that the base station has not successfully decoded the first target data packet and is unable to detect the target identification information, thus ensuring the continuous accessing process.

Embodiment Two

Figure 2:
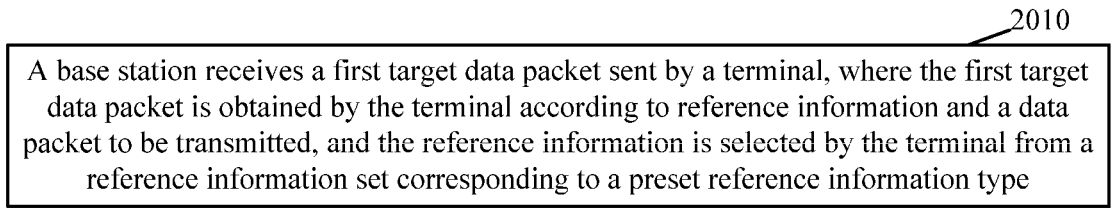
FIG. 2 is a flowchart of another data transmission method according to an embodiment.

The present embodiment provides another data transmission method. As shown in FIG. 2, the method includes a step described below.

In step 2010, a base station receives a first target data packet sent by a terminal, where the first target data packet is obtained by the terminal according to reference information and a data packet to be transmitted, and the reference information is selected by the terminal from a reference information set corresponding to a preset reference information type.

In the data transmission method provided by the embodiment, the base station receives the first target data packet sent by the terminal, the first target data packet is obtained by the terminal according to reference information and the data packet to be transmitted, and the reference information is selected by the terminal from the reference information set corresponding to the preset reference information type. As it can be seen from the present embodiment, since the reference information is selected by the terminal from the reference information set corresponding to the preset reference information type, the probability of selecting same reference information by different terminals is relatively low, and when reference information selected by different terminals is different, the interference among data packets will be greatly reduced, thus improving the probability of data packets being correctly decoded.

In an embodiment, before the base station receives the first target data packet sent by the terminal, the data transmission method further includes a step described below. Scheduling information containing a first resource identification is sent to the terminal. The scheduling information is used for indicating the terminal to send the data packet to be transmitted, and the first resource identification is used for identifying a resource occupied by the terminal when sending the first target data packet.

In an embodiment, the data packet to be transmitted is a data packet corresponding to a message 3 in a process of the terminal accessing a network, and the scheduling information is scheduling information corresponding to the message 3 in the process of the terminal accessing the network.

In an embodiment, after the base station receives the first target data packet sent by the terminal, the data transmission method further includes steps described below. Whether the first target data packet may be successfully decoded is determined, when the first target data packet is unsuccessfully decoded, a second resource identification is allocated for the terminal; and first retransmission scheduling information containing the second resource identification is sent to the terminal. The second resource identification is used for identifying a resource occupied by the terminal when resending the data packet to be transmitted, and the first retransmission scheduling information is used for indicating the terminal to resend the data packet to be transmitted.

In an embodiment, after the base station receives the first target data packet sent by the terminal, the data transmission method further includes steps described below. Whether the first target data packet may be successfully decoded and whether target identification information corresponding to the reference information may be detected are determined; when the first target data packet is unsuccessfully decoded and the target identification information is detected, a third resource identification is allocated for the terminal; and second retransmission scheduling information containing target identification information and the third resource identification is sent to the terminal. The third resource identification is used for identifying the resource occupied by the terminal when resending the data packet to be transmitted, and the second retransmission scheduling information is used for indicating the terminal to resend the data packet to be transmitted.

In the data transmission method provided by the present embodiment, whether the first target data packet may be successfully decoded and whether target identification information corresponding to the reference information may be detected are determined; when the first target data packet is unsuccessfully decoded and the target identification information is detected, the third resource identification is allocated for the terminal; and the second retransmission scheduling information containing the target identification information and the third resource identification is sent to the terminal. The third resource identification is used for identifying the resource occupied by the terminal when resending the data packet to be transmitted, and the second retransmission scheduling information is used for indicating the terminal to resend the data packet to be transmitted. As it can be seen from the present embodiment, since the second retransmission scheduling information includes the target identification information used for determining by the terminal whether the retransmission scheduling information is sent to the terminal, thereby avoiding blind retransmission of the data packet to be transmitted, and saving resources.

In an embodiment, the above method further includes steps described below. When the first target data packet is unsuccessfully decoded and the target identification information is undetected, a fourth resource identification is allocated for the terminal; and third retransmission scheduling information containing preset information and the fourth resource identification is sent to the terminal. The third retransmission scheduling information containing the preset information is used for indicating a terminal, which has received the third retransmission scheduling information, to resend the data packet to be transmitted, and the fourth resource identification is used for identifying the resource occupied by the terminal when resending the data packet to be transmitted.

In the data transmission method provided by the present embodiment, when the first target data packet is unsuccessfully decoded and the target identification information is undetected, the fourth resource identification is allocated for the terminal; and the third retransmission scheduling information containing the preset information and the fourth resource identification is sent to the terminal, the third retransmission scheduling information containing the preset information is used for indicating the terminal, which has received the third retransmission scheduling information, to resend the data packet to be transmitted, and the fourth resource identification is used for identifying the resource occupied by the terminal when resending the data packet to be transmitted. As it can be seen from the present embodiment, since the third retransmission scheduling information containing the preset information is used for indicating the terminal, which has received the retransmission scheduling information, to resend the data packet to be transmitted, the terminal may resend the data packet to be transmitted to the base station under the condition that the base station has not successfully decoded the first target data packet and is unable to detect the target identification information, thus ensuring the continuous accessing process.

The data transmission method provided in the present disclosure will be described below by a series of specific embodiments. Before the description of the specific embodiments, the technical terms related to these specific embodiments will be briefly described first.

The reference signal sequence includes one of: a cyclic shift interval of the reference signal sequence, a time domain orthogonal code sequence, the cyclic shift interval of the reference signal sequence and the time domain orthogonal code sequence, the cyclic shift interval of the reference signal sequence and a root sequence.

In the present embodiment, the cyclic shift interval of the reference signal sequence includes N/4, N/3, N/6, and N/12, where N is a length of the reference signal sequence.

The time domain orthogonal code sequence includes: when one transmission in time domain includes two time domain orthogonal frequency division multiplexing (OFDM) symbols (e.g., a subframe in a long term evolution (LTE) system includes reference signals of two time domain OFDM symbols, which may refer to the application of the time domain orthogonal code of the uplink reference signal sequence in the LTE system), the time domain orthogonal code sequence includes {1, 1} and {1, −1}. When one transmission in time domain includes four time domain OFDM symbols (e.g., a subframe includes reference signals of four time domain OFDM symbols or two subframes include reference signals of four time domain OFDM symbols, which is equivalent to spreading one reference signal sequence to reference signals of four time domain OFDM symbols through time domain spreading), the time domain orthogonal code sequence includes {1, 1, 1, 1}, {1, −1, 1, −1}, {1, 1, −1, −1}, and {1, −1, −1, 1}.

The root sequence includes root sequence group information, and the generation of the root sequence group information may refer to the LTE standard.

When the cyclic shift interval includes N/12, the reference signal sequence includes twelve sequences; when the cyclic shift interval includes N/6, the reference signal sequence includes six sequences; when the cyclic shift interval includes N/4, the reference signal sequence includes four sequences; and when the cyclic shift interval includes N/3, the reference signal sequence includes three sequences. When information about the time domain orthogonal code sequence includes {1, 1} and {1, −1}, and the cyclic shift interval includes N/3, the reference signal sequence includes six sequences (the time domain orthogonal code and the cyclic shift are superimposed to be used); and when the information about the time domain orthogonal code sequence includes {1, 1} and {1, −1}, and the cyclic shift interval includes N/6, the reference signal sequence includes twelve sequences (the time domain orthogonal code and the cyclic shifts are superimposed to be used).

A plurality of resource sets includes: a resource set is changed from multiplexing one UE to multiplexing a plurality of UEs, that is, from one resource set to R resource sets through a non-orthogonal transmission mode, where R is predefined and preconfigured. The non-orthogonal transmission mode includes a sparse code multiple access (SCMA), a multi-user shared access (MUSA), a non-orthogonal coded multiple access (NCMA), a non-orthogonal multiple access (NOMA), a pattern division multiple access (PDMA), a resource spread multiple access (RSMA), an interleave-grid multiple access (IGMA), a low density spreading with signature vector extension (LDS-SVE), a low code rate and signature based shared access (LSSA), a non-orthogonal coded access (NOCA), an interleave division multiple access (IDMA), a repetition division multiple access (RDMA) and a group orthogonal coded access (GOCA).

Embodiment Three

In the present embodiment, a target transmission mode is a transmission mode in which a reference signal sequence is added into a data packet, a base station carries information about the transmission mode in a system message, the information indicates whether a UE uses a reference signal sequence selected from a plurality of reference signal sequences to send together with the data packet, and when the UE uses the reference signal sequence selected from the plurality of reference signal sequences to send together with the data packet, the base station also carries information about the plurality of reference signal sequences in the system message.

In an enhanced machine type of communication (eMTC) system, the number of cyclic shifts of the reference signal sequence corresponding to the data packet is a fixed value, which causes the UE A and the UE B that send an access message on the same resource to send a same reference signal sequence on the same resource, thus resulting in data packets of the UE A and the UE B to interfere with each other, and it is difficult for the base station to decode correctly. Therefore, the scheme provided in the present disclosure is used, and applications are described as follows.

In the eMTC system, the base station carries the information about the transmission mode in one of the system message, a feedback message or retransmission scheduling information, and the information about the transmission mode may be represented by one bit, where 0 indicates that the technical scheme in the related art is adopted, and 1 indicates that the UE selects one reference signal sequence from the plurality of reference signal sequences to transmit together with the data packet.

It is assumed that the base station configures the information as 1 and configures a reference signal sequence set including eight sequences (sequence numbers are 0 to 7), the sequence set is acquired after transformation of a basic sequence according to the cyclic shift interval of N/4 (N is a length of the basic sequence) and the time domain orthogonal code of {1, 1} and {1, −1}, and the basic sequence is determined according to a frequency domain bandwidth allocated by the base station and the relevant contents of the eMTC R13 (TS36.211 d10) standard.

The UE A and the UE B select a same access resource in the access resource pool configured by the base station to send an access message (physical random access channel (PRACH)); the base station detects the access message on the access resource pool, and sends a feedback message for the access message, the feedback message includes uplink timing adjustment information and information about a resource occupied by the UE for sending the data packet; and the UE A and the UE B send the data packets respectively to the base station on a same resource (the resource allocated by the base station).

When the UE A and the UE B know that the base station has enabled a new transmission mode (a mode of selecting the reference signal sequence from the plurality of reference signal sequences to transmit together with the data packet), each of the UE A and the UE B randomly selects one reference signal sequence from the sequence set including eight sequences to send together with the data packet. It is assumed that the UE A selects a reference signal sequence 1, the UE B selects a reference signal sequence 3.

The base station detects and decodes data packets on the allocated resource according to each sequence in the sequence set separately. When the base station fails to successfully decode a data packet, the base station sends retransmission scheduling information for indicating the terminal to resend the data packet.

Both the UE A and the UE B detect the retransmission scheduling information sent by the base station, and the UE A and the UE B continue to randomly select a reference signal respectively from the reference signal sequence set for transmitting with the data packet.

The base station continues to detect and decode the data packets according to each sequence in the sequence set on the allocated resource separately. When the base station fails to successfully decode a data packet, the base station continues to send the retransmission scheduling information; and when the data packet is successfully decoded, the base station sends a response message of the data packet to the terminal.

It should to be noted that since each of the UE A and the UE B will randomly select the reference signal sequence for transmission each time when sending the data packet, it is inevitable that the UE A and the UE B will select different reference signal sequences for one or more times, thereby avoiding that the UE A and the UE B continuously use a same reference signal sequence on a same resource to send the data packet, and improving the success probability of the base station decoding the data packet.

Embodiment Four

In the present embodiment, a target transmission mode is a transmission mode in which a reference signal sequence and a scrambling sequence are added into the data packet, and a base station carries information about the transmission mode in a system message, the information indicates whether a UE uses a reference signal sequence selected from a plurality of reference signal sequences to send together with the data packet, and selects a sequence from a plurality of scrambling sequences to scramble the data packet.

When the target transmission mode is used, the base station further carries information about the plurality of reference signal sequences in the system message, and these reference signal sequences may be determined according to a cycle interval configured by the base station and whether the time domain orthogonal code is supported, or may be predefined without signaling configuration. For example, the number of the plurality of reference signal sequences is fixed as 8, and these eight reference signal sequences are generated according to information about the time domain orthogonal code sequence of $\{1, 1\}$ and $\{1,-1\}$, and the cyclic shift interval of N/4, or, the number of the plurality of reference signal sequences is fixed as 6, and these six reference signal sequences are generated according to the cyclic shift interval of N/6, or, the number of the plurality of reference signal sequences is fixed as 4, and these four reference signal sequences are generated according to the time domain orthogonal code sequence of $\{1, 1, 1, 1\}$, $\{1, -1, 1, -1\}$, $\{1, 1, -1, -1\}$, and $\{1, -1, -1, 1\}$.

The scrambling sequences may be generated according to the scrambling sequence generation manner in the LTE system, the calculation manner of a scrambling initial parameter in the LTE system is as follows, and when each UE sends a data packet, one scrambling sequence may be generated in a following manner:

$$c_{init}=n_{RNTI}\cdot2^{14}+q\cdot2^{13}+\lfloor n_s/2\rfloor\cdot2^9+N_{ID}^{cell}$$

where $n_{RNTI}$ denotes a radio network temporary identity, $q=0$ or 1, $n_s$ denotes a time slot index, and $N_{ID}^{cell}$ denotes a cell identity.

Based on the above formula, parameters k and n are introduced, k is an index of a scrambling sequence in the plurality of scrambling sequences, and n is a number of bits corresponding to an index of a maximum scrambling sequence. For example, the number of scrambling sequences is 4, n is 2, and the value of k includes 0, 1, 2 and 3; the number of scrambling sequences is 8, n is 3, and the value of k includes 0, 1, 2, 3, 4, 5, 6 and 7; and the number of scrambling sequences is 6, n is 3, and the value of k includes 0, 1, 2, 3, 4 and 5.

In an embodiment, the scrambling initial parameter may refer to a following form:

$$c_{init}=n_{RNTI}\cdot2^{14+n}+k\cdot2^{14}+q\cdot2^{13}+\lfloor n_s/2\rfloor\cdot2^9+N_{ID}^{cell}$$

or, $$c_{init}=n_{RNTI}\cdot2^{13+n}+k\cdot2^{13}+\lfloor n_s/2\rfloor\cdot2^9+N_{ID}^{cell}.$$

In the LTE system, the UE A and the UE B that send the access messages on the same resource will send a same reference signal sequence on the same resource, which causes data packets of the UE A and the UE B to interfere with each other, and it is difficult for the base station to decode correctly.

Therefore, the data transmission method provided in the present disclosure is used, and applications are described as follows.

The base station carries the information about the transmission mode in one of the system message, a feedback message or retransmission scheduling information, and the information about the transmission mode may be represented by one bit, where 0 indicates that the technical scheme in the related art is adopted, and 1 indicates that the UE selects a reference signal sequence from the plurality of reference signal sequences and a scrambling sequence from the plurality of scrambling sequences to send together with the data packet.

It is assumed that the base station configures the information as 1 and configures a reference signal sequence set including six sequences (sequence numbers are 0 to 5), the sequence set is acquired after transformation of a basic sequence according to the cyclic shift interval of N/6 (N is a length of the basic sequence), and the basic sequence is determined according to a frequency domain bandwidth allocated by the base station and the relevant contents of section 5.5 in the eMTC R13 (TS36.211 d10) standard.

The UE A and the UE B select a same access resource in the access resource pool configured by the base station to send an access message (PRACH) respectively; the base station detects the access messages on the access resource pool, and sends a feedback message for the access message, the feedback message includes uplink timing adjustment information and information (reference to TS36.213 standard) about a resource occupied by the UE for sending the data packet; and each of the UE A and the UE B sends the data packet to the base station on a same resource (the resource allocated by the base station).

When the UE A and the UE B know that the base station has enabled a new transmission mode (a mode for selecting one reference signal sequence from the plurality of reference signal sequences and one scrambling sequence from the plurality of scrambling sequences to transmit together with the data packet), each of the UE A and the UE B randomly selects one reference signal sequence from the six reference signal sequences and one scrambling sequence from six scrambling sequences to transmit together with the data packet, where the plurality of reference signal sequences has a one-to-one correspondence with the plurality of scrambling sequences, for example, a reference signal sequence having an index of k corresponds to a scrambling sequence having an index of k. It is assumed that the UE A selects a reference signal sequence 1 and a scrambling sequence 1, and the UE B selects a reference signal sequence 3 and a scrambling sequence 3.

The base station decodes data packets on the allocated resource according to each sequence in the sequence set and the corresponding scrambling sequence in the scrambling sequence set, respectively. When the base station fails to successfully decode the data packets, and detects the reference signal sequence 1 and the reference signal sequence 3, the base station may determine that there are two UEs sending the data packets on the same resource, the base station sends the retransmission scheduling information for indicating the terminals to resend the data packet, and carries a target transmission identification corresponding to the target transmission mode in the retransmission scheduling information. In the embodiment, the target transmission identification is index information (which is the information about the reference signal sequence detected by the base station) about the reference signal sequence.

Both the UE A and the UE B will detect the retransmission scheduling information sent by the base station. When the UE A detects that the index information about the reference signal sequence carried in the retransmission scheduling information is consistent with the reference sequence information (the reference signal sequence 1) selected by the UE A for the last transmission, the UE A considers that the retransmission scheduling information is sent to itself and resends the data packet according to the retransmission scheduling information; and when the UE A finds that the index information about the reference signal sequence carried in the retransmission scheduling information is inconsistent with the reference sequence information (the reference signal sequence 1) selected by the UE A for the last transmission, the UE A considers that the retransmission scheduling information is sent not to itself and continues to monitor downlink control information. A process of the UE B processing the retransmission scheduling information is the same as that of the UE A.

In this way, the UE A and the UE B may send the data packets on different resources according to the scheduling of the base station, thus preventing the UE A and the UE B from continuously sending the data packets on the same resource and improving the success rate of decoding data packets.

The base station detects and decodes data packets on the allocated resource according to each sequence in the sequence set respectively. When the base station fails to successfully decode the data packet and fails to detect the reference signal sequence, the base station sends the retransmission scheduling information and carries the reference sequence information set to be a specific value in the retransmission scheduling information, and the specific value indicates that it is valid for any UE. In this way, both the UE A and the UE B detect the retransmission scheduling information, each of the UE A and the UE B randomly reselects the reference signal sequence and the scrambling sequence according to the retransmission scheduling information, and resends the data packet on the resource indicated by the retransmission scheduling information.

If the data packet still cannot be decoded, the above process is repeated.

If the number of reference signal sequences and the number of scrambling sequences are different, the base station needs to detect according to various possibilities. For example, if the number of scrambling sequences is greater than the number of reference signal sequences, a reference signal sequence corresponds to multiple scrambling sequences, and for one reference signal sequence, the base station needs to detect and decode multiple corresponding scrambling sequences.

Embodiment Five

In the present embodiment, a target transmission mode is a transmission mode in which a reference signal sequence, a scrambling sequence, and a resource set are added into the data packet, and a base station carries information about the transmission mode in a system message, which indicates whether a UE uses one reference signal sequence selected from a plurality of reference signal sequences, a plurality of scrambling sequences and a plurality of resource sets to send together with the data packet, and selects a scrambling sequence from a plurality of scrambling sequences to scramble the data packet and a resource set from the plurality of resource sets for sending the data packet.

In a narrow band Internet of things (NB-IoT) system, the UE A and the UE B that send the access messages on the same resource will send a same reference signal sequence on the same resource, which causes data packets of the UE A and the UE B to interfere with each other, and it is difficult for the base station to decode correctly. Therefore, the data transmission method provided in the present disclosure used, and applications are described as follows.

The base station carries the information about the transmission mode in one of the system message, a feedback message, or retransmission scheduling information. The information about the transmission mode may be represented by one bit, where 0 indicates that the technical scheme in the related art is adopted, and 1 indicates that the UE selects one reference signal sequence from the plurality of reference signal sequences to send together with the data packet, selects a scrambling sequence from the plurality of scrambling sequences to scramble the data packet and a resource set from the plurality of resource sets for sending the data packet; or, 0 indicates that the technical scheme in the related art is adopted, 1 indicates that when the access fails, the UE selects a reference signal sequence from the plurality of reference signal sequences to send together with the data packet, and selects a scrambling sequence from the plurality of scrambling sequences to scramble the data packet and a resource set from the plurality of resource sequences for sending the data packet; or, 0 indicates that the technical scheme in the related art is adopted, 1 indicates that when resending the data packet, the UE selects a reference signal sequence from the plurality of reference signal sequences to send together with the data packet, and selects a scrambling sequence from the plurality of scrambling sequences to scramble the data packet and a resource set from the plurality of resource sequences for sending the data packet; or, 0 indicates that the technical scheme in the related art is adopted, 1 indicates that when the data packet is retransmitted after an hth time, the UE selects a reference signal sequence from the plurality of reference signal sequences to send together with the data packet, and selects a scrambling sequence from the plurality of scrambling sequences to scramble the data packet and a resource set from the plurality of resource sets for sending the data packet, where h is a predefined value.

It is assumed that the base station configures the information as 1 and configures a reference signal sequence set including four sequences (sequence numbers are 0 to 3), this sequence set is generated according to four time domain orthogonal codes and acquired after transformation of a basic sequence, and the basic sequence is determined according to a frequency domain bandwidth allocated by the base station and the relevant contents of the NB-IoT R13 (TS36.211) standard.

Refer to TS36.211 for the description of the plurality of scrambling sequences, and a scrambling initial parameter is defined as follows:

$$c_{init} = n_{RNTI} \cdot 2^{14+n} + k^{14} + q \cdot 2^{13} + \lfloor n_s/2 \rfloor \cdot 2^9 + N_{ID}^{cell}$$

where k is an index of a scrambling sequence in the plurality of scrambling sequences, and n is the number of bits corresponding to an index of the maximum scrambling sequence, for example, the number of scrambling sequences is 4, n is 2, and the value of k includes 0, 1, 2 and 3.

The UE A and the UE B select a same access resource in the access resource pool configured by the base station to send an access message (PRACH) respectively; the base station detects the access messages on the access resource pool, and sends a feedback message for the access message, the feedback message includes uplink timing adjustment information and information (reference to TS36.213 standard) about a resource occupied by the UE when sending the data packet; and each of the UE A and the UE B sends the data packet to the base station on the same resource (the resource allocated by the base station).

When the UE A and the UE B know that the base station has enabled a new transmission mode, each of the UE A and the UE B randomly selects one reference signal sequence from 4 reference signal sequences and 4 scrambling sequences to send together with the data packet, and selects one scrambling sequence from the plurality of scrambling sequences to scramble the data packet and a resource set from four resource sets to transmit a message 3, where the plurality of reference signal sequences, the plurality of scrambling sequences and the plurality of resource sets have a one-to-one correspondence with each other, for example, a reference signal sequence with an index of k corresponds to a scrambling sequence with an index of k and to a resource set with an index of k.

The base station decodes data packets on the allocated resource according to each sequence in the sequence set, the corresponding scrambling sequence and the corresponding non-orthogonal resource respectively. When the base station fails to successfully decode the data packet and detects the reference signal sequence 1 and the reference signal sequence 3, the base station may determine that there are two UEs sending the data packet on the same resource, the base station sends retransmission scheduling information for indicating the terminals to resend the data packet, and carries a target transmission identification corresponding to the target transmission mode in the retransmission scheduling information. In the present embodiment, the target transmission identification is index information (which is the index information about the resource set detected by the base station) about the resource set.

Both the UE A and the UE B detect the retransmission scheduling information sent by the base station. When the UE A detects that the index information about the resource set carried in the retransmission scheduling information is consistent with the resource set information (the resource set with the index of 1) selected by the UE A for the last transmission, the UE A considers that the retransmission scheduling information is sent to itself and resends the data packet according to the retransmission scheduling information; and when the UE A finds that the index information about the resource set carried in the retransmission scheduling information is inconsistent with the resource set information (the resource set with the index of 1) selected by the UE A for the last transmission, the UE A considers that the retransmission scheduling information is sent not to itself and continues to monitor downlink control information. The process of the UE B processing the retransmission scheduling information is the same as that of the UE A.

In this way, the UE A and the UE B may send the data packets on different resources according to the scheduling of the base station, thus preventing the UE A and the UE B from continuously sending the data packets on the same resource, and improving the success rate of data packet decoding.

The base station detects and decodes the data packets on the allocated resource according to each sequence in the sequence set respectively. When the base station fails to successfully decode the data packet and fails to detect the reference signal sequence, the base station sends the retransmission scheduling information and carries the resource set information set to be a specific value in the retransmission scheduling information, and the specific value indicates that it is valid for any UE. In this way, both the UE A and the UE B detect that license information, each of them reselects the reference signal sequence and the scrambling sequence according to the retransmission scheduling information, selects the resource set on a position indicated by the retransmission scheduling information and resends the data packet.

If the data packet still cannot be decoded, the above process is repeated.

If the number of reference signal sequences, the number of scrambling sequences and the number of resource sets are different, the base station needs to detect according to various possibilities. For example, if the number of resource sets is greater than the number of reference signal sequences, a reference signal sequence will correspond to multiple resource sets, and for one reference signal sequence, the base station needs to detect multiple corresponding resource sets.

Embodiment Six

In the present embodiment, a target transmission mode a transmission mode in which a reference signal sequence, a scrambling sequence and a resource set are added into the data packet. When the data packet is sent for the first time, the technical scheme in the related art is still adopted, and when the data packet is resent, the target transmission mode will be used. In a new radio (NR) system, the UE A and the UE B select a same access resource in the access resource pool configured by a base station to send an access message (PRACH); the base station detects an access message on the access resource pool, and sends a feedback message for the access message, the feedback message includes uplink timing adjustment information and information (reference to TS38.213 standard) about a resource occupied by sending the data packet; and each of the UE A and the UE B sends the data packet to the base station on a same resource (the resource allocated by the base station).

When the UE A and the UE B know that the base station has enabled a new transmission mode, each of the UE A and the UE B sends the data packet on the same resource to the base station by using a same transmission mode according to the information about the resource occupied by sending the data packet included in the feedback message.

The base station detects the data packet according to a single transmission mode (the mode indicated by the message 2), when the base station fails to decode, and sends retransmission scheduling information.

The UE A and the UE B send the data packets in the target transmission mode separately.

The base station detects and decodes the data packets one by one according to a combination of multiple transmission modes. If the decoding successes, a response message of the data packet is sent, and if the decoding is still not correct, the base station continues to send the retransmission schedule information.

Embodiment Seven

In the present embodiment, a target transmission mode is a transmission mode in which a reference signal sequence, a scrambling sequence and a resource set are added into the data packet. When the data packet is sent for a first time, the technical scheme in the related art is still adopted, and when the data packet is resent, the target transmission mode is used. In an NR system, the UE A and the UE B select a same access resource in the access resource pool configured by a base station to send an access message (PRACH) respectively; the base station detects an access message on the access resource pool, and sends a feedback message for the access message, the feedback message includes uplink timing adjustment information and information (reference to TS38.213 standard) about a resource occupied by sending the data packet; and each of the UE A and the UE B sends the data packet to the base station on a same resource (the resource allocated by the base station).

When the UE A and the UE B know that the base station has enabled a new transmission mode, each of the UE A and the UE B sends the data packet to the base station by using the same transmission mode on the same resource according to the information about the resource occupied by sending the data packet included in the feedback message.

The base station detects the data packets according to the single transmission mode, fails to decode, sends retransmission scheduling information and carries information (the information is set to be a specific value, and the specific value indicates that it is valid for any UE) about the transmission mode in the retransmission scheduling information. In this way, both the UE A and the UE B detect the retransmission scheduling information, each of them randomly selects one transmission mode for sending the data packet from a plurality of transmission modes according to the retransmission scheduling information.

Each of the UE A and the UE B selects one transmission mode from the plurality of transmission modes (which includes at least one of a reference signal sequence set, a scrambling sequence set or multiple resource sets) to send the data packet.

The base station detects and decodes the data packets one by one according to a combination of the multiple transmission modes. If the decoding successes, a response message of the data packet is sent.

When the base station detects the data packets one by one according to the combination of the multiple transmission modes, if the base station fails to successfully decode the message 3 and detects the information about the transmission mode (such as: information about the reference signal sequence, or, information about the resource set), the base station may determine that there are two UEs sending the data packet on the same resource, the base station sends retransmission scheduling information, and carries a target transmission identification corresponding to the transmission mode in the retransmission scheduling information.

In the present embodiment, the target transmission identification is index information (which is the index information about the reference signal sequence detected by the base station) about the reference signal sequence or index information (which is the index information about the resource set detected by the base station) about the resource set.

Both the UE A and the UE B detect the retransmission scheduling information sent by the base station. When the UE A detects that the target transmission identification carried in the retransmission scheduling information is consistent with the transmission identification of the transmission mode selected by the UE A for the last transmission, the UE A considers that the retransmission scheduling information is sent to itself and resends the data packet according to the retransmission scheduling information; and when the UE A finds that the target transmission identification carried in the retransmission scheduling information is inconsistent with the transmission identification of the transmission mode selected by the UE A for the last transmission, the UE A considers that the retransmission scheduling information is sent not to itself and continues to detect the downlink control information. A process of the UE B processing the retransmission scheduling information is the same as that of the UE A.

In this way, the UE A and the UE B may send the data packets on different resources according to the scheduling of the base station, thus preventing the UE A and the UE B from continuously sending the data packets on the same resource, and improving the success rate of decoding data packets.

The base station detects and decodes the data packets on the allocated resource according to each sequence in the sequence set respectively. When the base station fails to successfully decode the data packet and fails to detect the reference signal sequence, the base station sends the retransmission scheduling information and carries the resource set information set to be a specific value in the retransmission scheduling information, and the specific value indicates that it is valid for any UE. In this way, both the UE A and the UE B detect that license information, each of them reselects one reference signal sequence and one scrambling sequence according to the retransmission scheduling information, selects a resource set on a position indicated by the retransmission scheduling information and resends the data packet.

If the data packet still cannot be decoded, the above process is repeated.

For scenarios that support multiple coverage levels, the data transmission method provided by the present disclosure may configure a data packet transmission mode for each coverage level, or, it is limited that only enhanced coverage levels may select to configure whether to support the data packet transmission mode provided by the present disclosure, and conventional coverage levels do not support the data packet transmission mode provided by the present disclosure.

The above-mentioned schemes of multiple embodiments may be apply to other systems, such as an LTE system, an eMTC system, an NB-IoT system, an NR system and the like.

The size of the transmission block includes sizes of transmission blocks of various data packets, and each UE may randomly select one size from them, or, select the best-matched size for transmission according to its own needs on the sending service. And the base station correspondingly detects according to various sizes.

The phase rotation value includes various phase rotation sequences, and each UE may randomly select one phase rotation sequence to perform a phase selection on a modulation symbol of the data packet. And the base station may correspondingly detect according to the various rotation sequences.

The reference power value of the transmission data packet includes reference power values of various data packets, and each UE may randomly select one of the reference power values to serve as a sending power reference of the data packet.

The boosting power value of the transmission data packet includes boosting power values of various data packets, and each UE may randomly select one of the boosting power values to serve as the sending power reference of the data packet.

Figure 3:
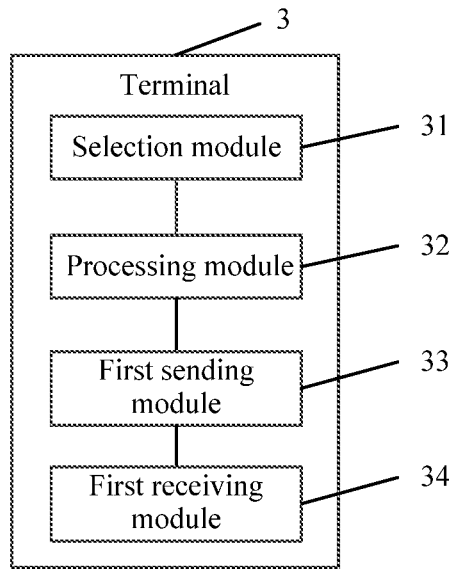
FIG. 3 is a structural diagram of a terminal according to an embodiment.

As shown in FIG. 3, a terminal is provided by the embodiment and includes a selection module 31, a processing module 32 and a first sending module 33. The selection module 31 is configured to select reference information from a reference information set corresponding to a preset reference information type. The processing module 32 is configured to obtain a first target data packet according to the selected reference information and a data packet to be transmitted. The first sending module 33 is configured to send the first target data packet to a base station.

In an embodiment, the above-mentioned terminal further includes a first receiving module 34. The first receiving module 34 is configured to receive scheduling information sent by the base station and containing a first resource identification, the scheduling information is used for indicating the terminal to send the data packet to be transmitted, and the first resource identification is used for identifying a resource occupied by the terminal when sending the first target data packet.

In an embodiment, the data packet to be transmitted is a data packet corresponding to a message 3 in a process of the terminal accessing a network, and the scheduling information is scheduling information corresponding to the message 3 in the process of the terminal accessing the network.

In an embodiment, the data packet to be transmitted is a data packet sent to the base station for a first time, or, the data packet to be transmitted is a data packet resent to the base station.

In an embodiment, the selection module 31 is configured to select, in a preset selection mode, the reference information from the reference information set corresponding to the preset reference information type.

In an embodiment, the first receiving module 34 is further configured to receive first retransmission scheduling information sent by the base station and containing a second resource identification, the first retransmission scheduling information is used for indicating the terminal to resend the data packet to be transmitted, and the second resource identification is used for identifying a resource occupied by the terminal when resending the data packet to be transmitted.

The first sending module 33 is further configured to resend the data packet to be transmitted according to the second resource identification.

In an embodiment, the first sending module 33 is configured to resend the data packet to be transmitted according to the second resource identification in following manners: reselecting, in the preset selection mode, reference information from the reference information set corresponding to the preset reference information type, obtaining a second target data packet according to the reselected reference information and the data packet to be transmitted, and sending the second target data packet to the base station on the resource corresponding to the second resource identification.

In an embodiment, the first receiving module 34 is further configured to receive second retransmission scheduling information sent by the base station and containing a third resource identification and target identification information corresponding to the reference information, the second retransmission scheduling information is used for indicating the terminal to resend the data packet to be transmitted, and the third resource identification is used for identifying the resource occupied by the terminal when resending the data packet to be transmitted.

The first sending module 33 is further configured to resend the data packet to be transmitted according to the third resource identification, when the target identification information in the second retransmission scheduling information is the same as identification information corresponding to the reference information selected by the terminal when sending the first target data packet.

In an embodiment, the first receiving module 34 is further configured to receive third retransmission scheduling information sent by the base station and containing preset information and a fourth resource identification, the third retransmission scheduling information containing the preset information is used for indicating a terminal, which has received the third retransmission scheduling information containing the preset information, to resend the data packet to be transmitted, and the fourth resource identification is used for identifying a resource occupied by the terminal when resending the data packet to be transmitted.

The first sending module 33 is further configured to resend the data packet to be transmitted according to the fourth resource identification.

In an embodiment, the preset selection mode includes one of a random selection mode, a mode for performing a selection according to a terminal identification corresponding to the terminal, a mode for performing a selection according to a downlink measurement value of the terminal, or a mode for performing a selection according to a size of a data packet to be transmitted.

In an embodiment, the mode for performing the selection according to the terminal identification corresponding to the terminal includes a mode for performing a selection according to a mapping relationship established between the terminal identification and the reference information; the mode for performing the selection according to the downlink measurement value of the terminal includes one of: a mode for performing a selection according to a mapping relationship established between a downlink status measurement value of the terminal and the reference information, a mode for performing a selection according to a mapping relationship established between a downlink path loss measurement value and the reference information, or a mode for performing a selection according to a mapping relationship established between a receiving power measurement value of a downlink reference signal and the reference information; and the mode for performing the selection according to the size of the data packet to be transmitted includes a mode for performing a selection according to a mapping relationship established between the size of the data packet to be transmitted and the reference information.

In an embodiment, the preset reference information type includes at least one of seven reference information types, and the seven reference information types include a reference signal sequence, a scrambling sequence, a transmission resource set, a size of a transmission block, a phase rotation value, a reference power value of a transmission data packet and a boosting power value of the transmission data packet, where a $k^{th}$ reference information type includes $X_k$ pieces of reference information, $X_k$ is a positive integer, and k=1, 2, . . . , 7.

The terminal provided by the embodiment selects the reference information from the reference information set corresponding to the preset reference information type, the first target data packet is obtained according to the selected reference information and the data packet to be transmitted, and the first target data packet is sent to the base station. As it can be seen from the embodiment, since the reference information is selected by the terminal from the reference information set corresponding to the preset reference information type, the probability of selecting same reference information by different terminals is relatively low. When reference information selected by different terminals is different, the interference among data packets will be greatly reduced, thus improving the probability of the data packets being correctly decoded.

In a practical application, the selection module 31, the processing module 32, the first sending module 33 and the first receiving module 34 may be implemented by a central processing unit (CPU), a micro processor unit (MPU), a digital signal processor (DSP) or a field programmable gate array (FPGA) located in the terminal.

Figure 4:
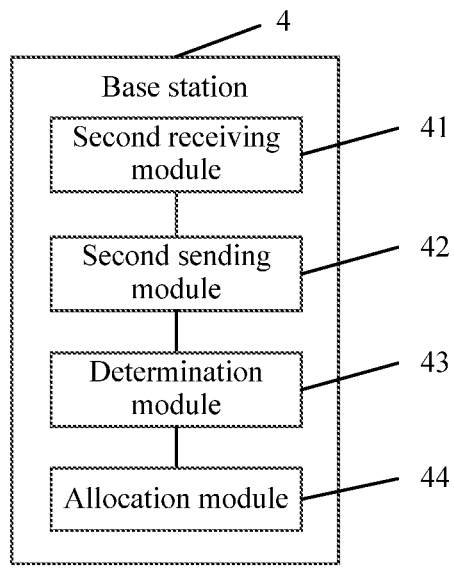
FIG. 4 is a structural diagram of a base station according to an embodiment.

As shown in FIG. 4, a base station 4 is provided by the embodiment and includes a second receiving module 41. The second receiving module 41 is configured to receive a first target data packet sent by a terminal, the first target data packet is obtained by the terminal according to reference information and a data packet to be transmitted, and the reference information is selected by the terminal from a reference information set corresponding to a preset reference information type.

In an embodiment, the above-mentioned base station further includes a second sending module 42. The second sending module 42 is configured to send scheduling information containing a first resource identification, the scheduling information is used for indicating the terminal to send the data packet to be transmitted, and the first resource identification is used for identifying a resource occupied by the terminal when sending the first target data packet.

In an embodiment, the data packet to be transmitted is a data packet corresponding to a message 3 in a process of the terminal accessing a network, and the scheduling information is scheduling information corresponding to the message 3 in the process of accessing the network by the terminal.

In an embodiment, the above-mentioned base station further includes a determination module 43. The determination module 43 is configured to determine whether the first target data packet is successfully decoded.

In an embodiment, the above-mentioned base station further includes an allocation module 44. The allocation module 44 is configured to allocate a second resource identification for the terminal, when the first target data packet is unsuccessfully decoded, the second resource identification is used for identifying a resource occupied by the terminal when resending the data packet to be transmitted.

The second sending module 42 is further configured to send first retransmission scheduling information containing the second resource identification to the terminal, the first retransmission scheduling information is used for indicating the terminal to resend the data packet to be transmitted.

In an embodiment, the determination module 43 is configured to determine whether the first target data packet is successfully decoded and whether target identification information corresponding to the reference information is detected.

In an embodiment, the allocation module 44 is configured to allocate a third resource identification for the terminal, when the first target data packet is unsuccessfully decoded and the target identification information is detected, the third resource identification is used for identifying a resource occupied by the terminal when resending the data packet to be transmitted.

The second sending module 42 is further configured to send second retransmission scheduling information containing the target identification information and the third resource identification to the terminal, the second retransmission scheduling information is used for indicating the terminal to resend the data packet to be transmitted.

In an embodiment, the allocation module 44 is further configured to allocate a fourth resource identification for the terminal, when the first target data packet is unsuccessfully decoded and the target identification information is undetected, the fourth resource identification is used for identifying a resource occupied by the terminal when resending the data packet to be transmitted.

The second sending module 42 is further configured to send third retransmission scheduling information containing preset information and the fourth resource identification to the terminal, the third retransmission scheduling information containing the preset information is used for indicating any terminal, which has received the third retransmission scheduling information containing the preset information, to resend the data packet to be transmitted.

The base station provided by the embodiment receives the first target data packet sent by the terminal, the first target data packet is obtained by the terminal according to the reference information and the data packet to be transmitted, and the reference information is selected by the terminal from the reference information set corresponding to the preset reference information type. As it can be seen from the present embodiment, since the reference information is selected by the terminal from the reference information set corresponding to the preset reference information type, the probability of selecting same reference information by different terminals is relatively low. When reference information selected by different terminals is different, the interference between data packets will be greatly reduced, thus improving the probability of the data packets being correctly decoded.

In practical application, the second receiving module 41, the second sending module 42, the determination module 43 and the allocation module 44 may be all implemented by a CPU, an MPU, a DSP or an FPGA located in the base station.

A data transmission apparatus is provided by the embodiment and includes a first memory and a first processor. The first memory stores instructions executable by the first processor, and the instructions include: selecting reference information from a reference information set corresponding to a preset reference information type, obtaining a first target data packet according to the selected reference information and a data packet to be transmitted, and sending the first target data packet to a base station.

In the present embodiment, the first memory and the first processor may be connected via a bus or otherwise.

In an embodiment, the first memory further stores instructions executable by the first processor. The instructions include: receiving scheduling information sent by the base station and containing a first resource identification, the scheduling information is used for indicating the terminal to send the data packet to be transmitted, and the first resource identification is used for identifying a resource occupied by the terminal when sending the first target data packet.

In an embodiment, the data packet to be transmitted is a data packet corresponding to a message 3 in a process of the terminal accessing a network, and the scheduling information is scheduling information corresponding to the message 3 in the process of the terminal accessing the network.

In an embodiment, the data packet to be transmitted is a data packet sent to the base station for a first time, or, the data packet to be transmitted is a data packet resent to the base station.

In an embodiment, the first memory further stores instructions executable by the first processor, the instructions include selecting, in a preset selection mode, the reference information from the reference information set corresponding to the preset reference information type.

In an embodiment, the first memory further stores instructions executable by the first processor, and the instructions include receiving first retransmission scheduling information sent by the base station and containing a second resource identification, and resending the data packet to be transmitted according to the second resource identification, where the first retransmission scheduling information is used for indicating the terminal to resend the data packet to be transmitted, and the second resource identification is used for identifying a resource occupied by the terminal when resending the data packet to be transmitted.

In an embodiment, the first memory further stores instructions executable by the first processor, the instructions include: reselecting, in the preset selection mode, the reference information from the reference information set corresponding to the preset reference information type, obtaining a second target data packet according to the reselected reference information and the data packet to be transmitted, and sending the second target data packet to the base station on the resource corresponding to the second resource identification.

In an embodiment, the first memory further stores instructions executable by the first processor, and the instructions include: receiving second retransmission scheduling information sent by the base station and containing a third resource identification and target identification information corresponding to the reference information; and resending the data packet to be transmitted according to the third resource identification, when the target identification information in the second retransmission scheduling information is the same as identification information corresponding to the reference information selected by the terminal when sending the first target data packet, where the second retransmission scheduling information is used for indicating the terminal to resend the data packet to be transmitted, and the third resource identification is used for identifying a resource occupied by the terminal when resending the data packet to be transmitted.

In an embodiment, the first memory further stores instructions executable by the first processor, and the instructions include receiving third retransmission scheduling information a third resource identification preset information and a fourth resource identification, and resending the data packet to be transmitted according to the fourth resource identification, where the third retransmission scheduling information containing the preset information is used for indicating any terminal, which has received the third retransmission scheduling information containing the preset information, to resend the data packet to be transmitted, and the fourth resource identification is used for identifying a resource occupied by the terminal when resending the data packet to be transmitted.

In an embodiment, the preset selection mode includes one of: a random selection mode, a mode for performing a selection according to a terminal identification corresponding to the terminal, a mode for performing a selection according to a downlink measurement value of the terminal, or a mode for performing a selection according to a size of a data packet to be transmitted.

In an embodiment, the mode for performing the selection according to the terminal identification corresponding to the terminal includes a mode for performing a selection according to a mapping relationship established between the terminal identification and reference information; the mode for performing the selection according to the downlink measurement value of the terminal includes one of: a mode for performing a selection according to a mapping relationship established between a downlink status measurement value of the terminal and the reference information, a mode for performing a selection according to a mapping relationship established between a downlink path loss measurement value and the reference information, or a mode for performing a selection according to a mapping relationship established between a receiving power measurement value of a downlink reference signal and the reference information; and the mode for performing the selection according to the size of the data packet to be transmitted includes a mode for performing a selection according to a mapping relationship established between the size of the data packet to be transmitted and the reference information.

In an embodiment, the preset reference information type includes at least one of seven reference information types, and the seven reference information types include a reference signal sequence, a scrambling sequence, a transmission resource set, a size of a transmission block, a phase rotation value, a reference power value of a transmission data packet and a boosting power value of the transmission data packet, where a $k^{th}$ reference information type includes $X_k$ pieces of reference information, $X_k$ is a positive integer, and $k=1, 2, \ldots, 7$. In an embodiment, when the preset reference information type includes at least two of reference information types, a mapping relationship exists among reference information of different reference information types.

A data transmission apparatus is further provided by the embodiment and includes a second memory and a second processor. The second memory stores instructions executable by the second processor, and the instructions include receiving a first target data packet sent by a terminal, where the first target data packet is obtained by the terminal according to reference information and a data packet to be transmitted, and the reference information is selected by the terminal from a reference information set corresponding to a preset reference information type.

In the present embodiment, the second memory and the second processor may be connected via a bus or otherwise.

In an embodiment, the second memory further stores an instruction executable by the second processor. The instruction includes sending scheduling information containing a first resource identification to the terminal, where the scheduling information is used for indicating the terminal to send the data packet to be transmitted, and the first resource identification is used for identifying a resource occupied by the terminal when sending the first target data packet.

In an embodiment, the data packet to be transmitted is a data packet corresponding to a message 3 in a process of the terminal accessing a network, and the scheduling information is scheduling information corresponding to the message 3 in the process of the terminal accessing the network.

In an embodiment, the second memory further stores instructions executable by the second processor, and the instructions include: determining whether the first target data packet is successfully decoded; allocating a second resource identification for the terminal, in response to determining that the first target data packet is unsuccessfully decoded; and sending first retransmission scheduling information containing the second resource identification to the terminal, where the second resource identification is used for identifying a resource occupied by the terminal when resending the data packet to be transmitted, and the first retransmission scheduling information is used for indicating the terminal to resend the data packet to be transmitted.

In an embodiment, the second memory further stores instructions executable by the second processor, and the instructions include: determining whether the first target data packet is successfully decoded and whether target identification information corresponding to the reference information is detected; allocating a third resource identification for the terminal, in response to determining that the first target data packet is unsuccessfully decoded and the target identification information is detected; and sending second retransmission scheduling information containing the target identification information and the third resource identification to the terminal, where the third resource identification is used for identifying the resource occupied by the terminal when resending the data packet to be transmitted, and the second retransmission scheduling information is used for indicating the terminal to resend the data packet to be transmitted.

In an embodiment, the second memory further stores instructions executable by the second processor, and the instructions include in response to determining that the first target data packet is unsuccessfully decoded and the target identification information is undetected, allocating a fourth resource identification for the terminal; and sending third retransmission scheduling information containing preset information and the fourth resource identification to the terminal, where the fourth resource identification is used for identifying the resource occupied by the terminal when resending the data packet to be transmitted, and the third retransmission scheduling information containing the preset information is used for indicating any terminal, which has received the third retransmission scheduling information containing the preset information, to resend the data packet to be transmitted.

The embodiments of the present disclosure further provide a computer-readable storage medium configured to store computer-executable instructions for performing the data transmission method provided by any embodiment of the present disclosure.

What is claimed is:

1. A data transmission method, comprising:
   selecting, by a terminal, reference information from a reference information set corresponding to a preset reference information type;
   obtaining a first target data packet according to the selected reference information and a data packet to be transmitted; and
   sending the first target data packet to a base station;
   wherein after sending the first target data packet to the base station, the method further comprises:
   in response to determining that the first target data packet is unsuccessfully decoded, receiving one of the following information sent by the base station: first retransmission scheduling information containing a second resource identification, second retransmission scheduling information containing a third resource identification and target identification information corresponding to the reference information, or third retransmission scheduling information containing preset information and a fourth resource identification; wherein the second resource identification, the third resource identification and the fourth resource identification are respectively used for identifying a resource occupied by the terminal in a case of sending the data packet to be transmitted; and
   sending the data packet to be transmitted according to the received one of the first retransmission scheduling information, the second retransmission scheduling information, or the third retransmission scheduling information.

2. The data transmission method of claim 1, wherein before selecting, by the terminal, the reference information from the reference information set corresponding to the preset reference information type, the method further comprises:
   receiving, by the terminal, scheduling information sent by the base station and containing a first resource identification, wherein the scheduling information is used for indicating the terminal to send the data packet to be transmitted, and the first resource identification is used for identifying a resource occupied by the terminal in a case of sending the first target data packet.

3. The data transmission method of claim 2, wherein the data packet to be transmitted is a data packet corresponding to a message 3 in a process of the terminal accessing a network, and the scheduling information is scheduling information corresponding to the message 3 in the process of the terminal accessing the network.

4. The data transmission method of claim 1, wherein the data packet to be transmitted is a data packet sent to the base station for a first time, or the data packet to be transmitted is a data packet resent to the base station.

5. The data transmission method of claim 1, wherein selecting, by the terminal, the reference information from the reference information set corresponding to the preset reference information type comprises:

selecting, by the terminal in a preset selection mode, the reference information from the reference information set corresponding to the preset reference information type.

6. The data transmission method of claim 5,
wherein in response to determining that the first target data packet is unsuccessfully decoded and receiving the first retransmission scheduling information sent by the base station and containing the second resource identification, sending the data packet to be transmitted comprises:
resending the data packet to be transmitted according to the second resource identification contained in the first retransmission scheduling information, wherein the first retransmission scheduling information is used for indicating the terminal to resend the data packet to be transmitted.

7. The data transmission method of claim 6, wherein resending the data packet to be transmitted according to the second resource identification contained in the first retransmission scheduling information comprises:
reselecting, in the preset selection mode, reference information from the reference information set corresponding to the preset reference information type;
obtaining a second target data packet according to the reselected reference information and the data packet to be transmitted; and
sending the second target data packet to the base station on the resource corresponding to the second resource identification.

8. The data transmission method of claim 5,
wherein in response to determining that the first target data packet is unsuccessfully decoded and receiving the second retransmission scheduling information sent by the base station and containing the third resource identification and the target identification information corresponding to the reference information, sending the data packet to be transmitted comprises:
in a case where the target identification information in the second retransmission scheduling information is the same as identification information corresponding to the reference information selected by the terminal in a case of sending the first target data packet, resending the data packet to be transmitted according to the third resource identification contained in the second retransmission scheduling information; wherein the second retransmission scheduling information is used for indicating the terminal to resend the data packet to be transmitted.

9. The data transmission method of claim 5,
wherein in response to determining that the first target data packet is unsuccessfully decoded and receiving the third retransmission scheduling information sent by the base station and containing the preset information and the fourth resource identification, sending the data packet to be transmitted comprises:
resending the data packet to be transmitted according to the fourth resource identification contained in the third retransmission scheduling information; wherein the third retransmission scheduling information containing the preset information is used for indicating a terminal, which has received the third retransmission scheduling information containing the preset information, to resend the data packet to be transmitted.

10. The data transmission method of claim 5, wherein the preset selection mode comprises one of: a random selection mode, a mode for performing a selection according to a terminal identification corresponding to the terminal, a mode for performing a selection according to a downlink measurement value of the terminal, or a mode for performing a selection according to a size of a data packet to be transmitted.

11. The data transmission method of claim 10, wherein the mode for performing the selection according to the terminal identification corresponding to the terminal comprises a mode for performing a selection according to a mapping relationship established between the terminal identification and the reference information;
the mode for performing the selection according to the downlink measurement value of the terminal comprises one of: a mode for performing a selection according to a mapping relationship established between a downlink path loss measurement value and the reference information, or a mode for performing a selection according to a mapping relationship established between a receiving power measurement value of a downlink reference signal and the reference information; and
the mode for performing the selection according to the size of the data packet to be transmitted comprises a mode for performing a selection according to a mapping relationship established between the size of the data packet to be transmitted and the reference information.

12. The data transmission method of claim 1, wherein the preset reference information type comprises at least one of seven reference information types, and the seven reference information types comprise a reference signal sequence, a scrambling sequence, a transmission resource set, a size of a transmission block, a phase rotation value, a reference power value of a transmission data packet and a boosting power value of the transmission data packet, wherein a $k^{th}$ reference information type comprises $X_k$ pieces of reference information, $X_k$ is a positive integer, and $k=1, 2, \ldots, 7$; and
when the preset reference information type comprises at least two reference information types, a mapping relationship exists among reference information of different reference information types.

13. A data transmission method, comprising:
receiving, by a base station, a first target data packet sent by a terminal, wherein the first target data packet is obtained by the terminal according to reference information and a data packet to be transmitted, and the reference information is selected by the terminal from a reference information set corresponding to a preset reference information type;
determining whether the first target data packet is successfully decoded;
in response to determining that the first target data packet is unsuccessfully decoded, allocating one of a second resource identification, a third resource identification or a fourth resource identification for the terminal; wherein the second resource identification, the third resource identification and the fourth resource identification are respectively used for identifying a resource occupied by the terminal in a case of sending the data packet to be transmitted; and
sending, to the terminal, one of first retransmission scheduling information containing the second resource identification, second retransmission scheduling information containing the third resource identification and target identification information corresponding to the reference information, or third retransmission scheduling information containing preset information and the fourth resource identification.

14. The data transmission method of claim 13, wherein before receiving, by the base station, the first target data packet sent by the terminal, the method further comprises:
sending, by the base station, scheduling information containing a first resource identification to the terminal, wherein the scheduling information is used for indicating the terminal to send the data packet to be transmitted, and the first resource identification is used for identifying a resource occupied by the terminal in a case of sending the first target data packet.

15. The data transmission method of claim 14, wherein the data packet to be transmitted is a data packet corresponding to a message 3 in a process of the terminal accessing a network, and the scheduling information is scheduling information corresponding to the message 3 in the process of the terminal accessing the network.

16. The data transmission method of claim 13, and wherein in response to determining that the first target data packet is unsuccessfully decoded and allocating the second resource identification for the terminal, sending one of the first retransmission scheduling information containing the second resource identification, the second retransmission scheduling information containing the third resource identification and the target identification information corresponding to the reference information, or the third retransmission scheduling information containing the preset information and the fourth resource identification to the terminal comprises:
sending the first retransmission scheduling information containing the second resource identification to the terminal, wherein the first retransmission scheduling information is used for indicating the terminal to resend the data packet to be transmitted.

17. The data transmission method of claim 13, wherein in response to determining that the first target data packet is unsuccessfully decoded, the method further comprises:
determining whether the target identification information corresponding to the reference information is detected;
wherein in response to determining the target identification information is detected and allocating the third resource identification for the terminal, sending one of the first retransmission scheduling information containing the second resource identification, the second retransmission scheduling information containing the third resource identification and the target identification information corresponding to the reference information, or the third retransmission scheduling information containing the preset information and the fourth resource identification to the terminal comprises:
sending the second retransmission scheduling information containing the target identification information and the third resource identification to the terminal, wherein the second retransmission scheduling information is used for indicating the terminal to resend the data packet to be transmitted; and
wherein in response to determining the target identification information is undetected and allocating the fourth resource identification for the terminal, sending one of the first retransmission scheduling information containing the second resource identification, the second retransmission scheduling information containing the third resource identification and the target identification information corresponding to the reference information, or the third retransmission scheduling information containing the preset information and the fourth resource identification to the terminal comprises:
sending the third retransmission scheduling information containing the preset information and the fourth resource identification to the terminal, wherein the third retransmission scheduling information is used for indicating a terminal, which has received the third retransmission scheduling information containing the preset information, to resend the data packet to be transmitted.

18. A terminal, comprising:
a processor and a memory, wherein the processor is configured to execute a program stored in the memory to implement the data transmission method of claim 1.

19. A base station, comprising:
a processor and a memory, wherein the processor is configured to execute a program stored in the memory to implement the data transmission method of claim 13.

20. A data transmission apparatus, comprising a memory and a processor, wherein the memory stores instructions executable by the processor, and the instructions, when executed by the processor, implement the method of claim 1.

* * * * *